(12) United States Patent
Kanjiyani et al.

(10) Patent No.: US 9,657,642 B2
(45) Date of Patent: May 23, 2017

(54) TURBINE SECTIONS OF GAS TURBINE ENGINES WITH DUAL USE OF COOLING AIR

(71) Applicant: HONEYWELL INTERNATIONAL INC., Morristown, NJ (US)

(72) Inventors: Shezan Kanjiyani, Glendale, AZ (US); John Gintert, Tempe, AZ (US); Rajiv Rana, Tempe, AZ (US); Lorenzo Crosatti, Phoenix, AZ (US); Bradley Reed Tucker, Chandler, AZ (US); Ed Zurmehly, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 482 days.

(21) Appl. No.: 14/227,924

(22) Filed: Mar. 27, 2014

(65) Prior Publication Data

US 2015/0275763 A1  Oct. 1, 2015

(51) Int. Cl.
*F02C 7/18* (2006.01)
*F01D 25/12* (2006.01)
(Continued)

(52) U.S. Cl.
CPC ............... *F02C 7/18* (2013.01); *F01D 5/187* (2013.01); *F01D 11/08* (2013.01); *F01D 25/12* (2013.01);
(Continued)

(58) Field of Classification Search
CPC .......... F01D 5/187; F01D 11/08; F01D 25/12; F01D 25/14; F02C 3/10; F02C 7/18;
(Continued)

(56) References Cited

U.S. PATENT DOCUMENTS 4,157,232 A   6/1979   Bobo et al.
4,526,226 A   7/1985   Hsia et al.
(Continued)

FOREIGN PATENT DOCUMENTS

DE    660545       3/1935
EP    0515130 A1   11/1992
(Continued)

OTHER PUBLICATIONS

General Electric Company; Patent Issued for Flange with Axially Curved Impingement Surface for Gas Turbine Engine Clearance Control; Journal of Engineering, Mar. 27, 2013. NewsRX. [Retrieved from Internet http://search.proquest.com/professional/docview/1318022974/141A2F3CD3E76439D91/1 . . . ].

(Continued)

*Primary Examiner* — Audrey K Bradley
(74) *Attorney, Agent, or Firm* — Lorenz & Kopf, LLP

(57) ABSTRACT

A turbine section includes a stator assembly having an inner diameter end wall, an outer diameter end wall, and a stator vane; a turbine rotor assembly including a rotor blade extending into the mainstream gas flow path; a housing including an annular shroud that circumscribes the rotor blade and at least partially defines the mainstream hot gas flow path; a first baffle arranged to define a first cavity with the outer diameter end wall of the stator assembly; a second baffle; and a third baffle arranged to define a second cavity with the second baffle and a third cavity with the shroud. The first cavity is fluidly coupled to the second cavity and the second cavity is fluidly coupled to the third cavity such that cooling air flows from the first cavity to the second cavity and from the second cavity to the third cavity.

9 Claims, 5 Drawing Sheets

(51) Int. Cl.
  *F01D 25/14* (2006.01)
  *F01D 5/18* (2006.01)
  *F01D 11/08* (2006.01)
  *F02C 3/10* (2006.01)

(52) U.S. Cl.
  CPC ............... *F01D 25/14* (2013.01); *F02C 3/10* (2013.01); *F05D 2240/81* (2013.01); *F05D 2260/201* (2013.01); *F05D 2260/205* (2013.01); *Y02T 50/673* (2013.01); *Y02T 50/676* (2013.01)

(58) Field of Classification Search
  CPC ........... F05D 2240/81; F05D 2260/201; F05D 2260/205; Y02T 50/673; Y02T 50/676
  See application file for complete search history.

(56) References Cited

U.S. PATENT DOCUMENTS

| | | |
|---|---|---|
| 4,643,250 A | 2/1987 | Niggemann et al. |
| 5,584,651 A | 12/1996 | Pietraszkiewicz et al. |
| 6,174,134 B1 | 1/2001 | Lee et al. |
| 6,779,597 B2 | 8/2004 | DeMarche et al. |
| 7,097,418 B2 | 8/2006 | Trindade et al. |
| 7,665,953 B2 | 2/2010 | Lee et al. |
| 8,137,056 B2 | 3/2012 | Fujimoto et al. |
| 8,438,851 B1 | 5/2013 | Uhm et al. |
| 2010/0034638 A1 | 2/2010 | Chambers et al. |
| 2013/0104552 A1 | 5/2013 | Uhm et al. |

FOREIGN PATENT DOCUMENTS

| | | |
|---|---|---|
| EP | 1533478 A2 | 5/2005 |
| GB | 753633 | 7/1956 |

OTHER PUBLICATIONS

Proctor, R., et al.; Shroud Cooling Assembly for Gas Turbine Engine; ProQuest Dialog. 2010 [Retrieved from Internet http://search.proquest.com/professional/docview/31552958/141A2F3CD3E76439D91/113 . . . ].

Lee, C-P., et al.; Corner Cooled Turbine Nozzle; ProQuest Dialog. 2010 [Retrieved from Internet http://search.proquest.com/professional/docview/30847091/141A2F3CD3E76439D91/146 . . . ].

Extended EP Search Report for Application No. 15151704.2-1610 dated Jul. 29, 2015.

TURBINE SECTIONS OF GAS TURBINE ENGINES WITH DUAL USE OF COOLING AIR

STATEMENT REGARDING FEDERALLY SPONSORED RESEARCH OR DEVELOPMENT

This invention was made with Government support under Contract No. W911W6-08-2-0001 awarded by the US Army. The Government has certain rights in this invention.

TECHNICAL FIELD

The present invention generally relates to gas turbine engines, and more particularly relates to turbine sections of gas turbine engines with improved cooling characteristics.

BACKGROUND

A gas turbine engine may be used to power various types of vehicles and systems. A particular type of gas turbine engine that may be used to power aircraft is a turbofan gas turbine engine. A turbofan gas turbine engine conventionally includes, for example, five major sections: a fan section, a compressor section, a combustor section, a turbine section, and an exhaust section. The fan section is typically positioned at the inlet section of the engine and includes a fan that induces air from the surrounding environment into the engine and accelerates a fraction of this air toward the compressor section. The remaining fraction of air induced into the fan section is accelerated into and through a bypass plenum and out the exhaust section.

The compressor section raises the pressure of the air it receives from the fan section, and the resulting compressed air then enters the combustor section, where a ring of fuel nozzles injects a steady stream of fuel into a combustion chamber formed between inner and outer liners. The fuel and air mixture is ignited to form combustion gases, which drive rotors in the turbine section for power extraction. In a typical configuration, the turbine section includes rows of stator vanes and rotor blades disposed in an alternating sequence along the axial length of a generally annular hot gas flow path. The rotor blades are mounted at the periphery of one or more rotor disks that are coupled to drive a main engine shaft. The gases then exit the engine at the exhaust section.

In most gas turbine engine applications, it is desirable to regulate the operating temperature of certain engine components in order to prevent overheating and potential mechanical failures attributable thereto. Most turbine components, particularly those exposed to the high temperatures of the mainstream gas flow, may benefit from temperature management. Accordingly, in many turbine sections, the volumetric space disposed radially inwardly or outwardly from the hot gas flow path includes internal cavities through which cooling air flow is provided. The cooling of the turbine components attempts to maintain temperatures that are suitable for material and stress level.

In many conventional engines, relatively high levels of cooling air flows have been used to obtain satisfactory temperature control of turbine components. However, it is generally desirable to employ mechanisms to minimize this cooling air since air from the compressor used for cooling is not available for combustion.

Accordingly, it is desirable to provide gas turbine engines with turbine sections having improved thermal management. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a turbine section of a gas turbine engine is provided. The turbine section includes a stator assembly comprising an inner diameter end wall, an outer diameter end wall, and a stator vane extending between the inner diameter end wall and the outer diameter end wall within a mainstream gas flow path; a turbine rotor assembly downstream of the stator assembly and including a rotor blade extending into the mainstream gas flow path; a housing including an annular shroud that circumscribes the rotor blade and at least partially defines the mainstream hot gas flow path; a first baffle arranged to define a first cavity with the outer diameter end wall of the stator assembly; a second baffle; and a third baffle arranged to define a second cavity with the second baffle and a third cavity with the shroud. The first cavity is fluidly coupled to the second cavity and the second cavity is fluidly coupled to the third cavity such that cooling air flows from the first cavity to the second cavity and from the second cavity to the third cavity.

In accordance with an exemplary embodiment, a method is provided for cooling turbine components in a gas turbine engine. The method includes directing a flow of cooling air from a main cavity through a first set of holes in a first baffle into a first cavity to impinge an outer diameter end wall of a stator assembly; directing a first portion of the flow of cooling air through a second set of holes in an aft rail of the outer diameter end wall of the stator assembly into a second cavity; and directing the first portion of the flow of cooling air through a third set of holes in a second baffle into a third cavity to impinge a rotor shroud.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any theory presented in the preceding background or the following detailed description.

Broadly, exemplary embodiments discussed herein include gas turbine engines with turbine sections that maintain suitable temperatures with improved efficiency. More particularly, exemplary turbine sections include a housing with baffles that direct cooling air onto the outer diameter end wall of the stator assembly and subsequently direct a portion of that air from the outer diameter end wall to the rotor shroud. In effect, the cooling air is pre-used (or reused) to cool two different areas, thereby enabling higher operating temperatures and/or a reduction in the amount of cooling air needed to maintain appropriate temperatures.

Figure 1:
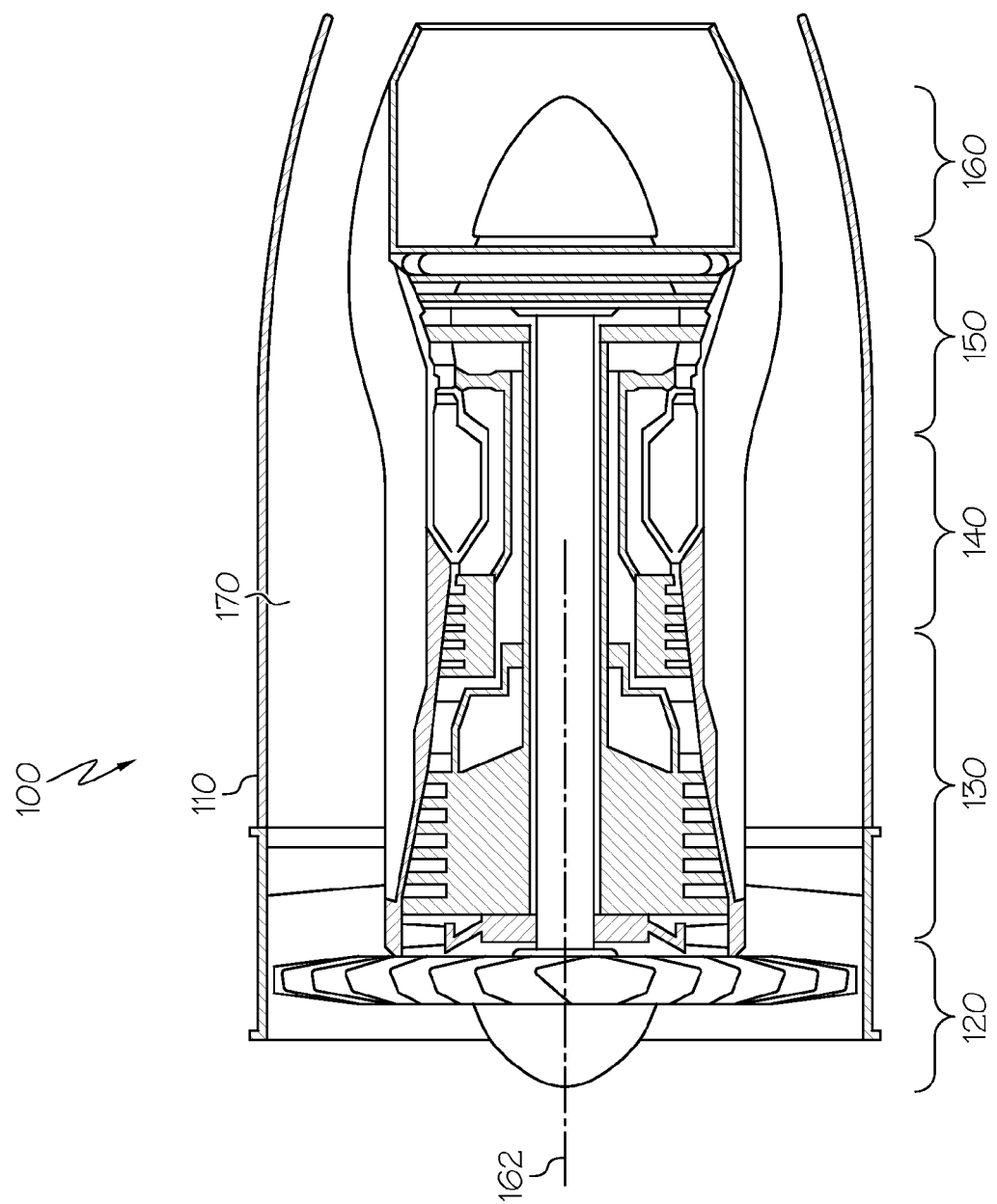
FIG. 1 is a partial cross-sectional view of a gas turbine engine in accordance with an exemplary embodiment.

FIG. 1 is a cross-sectional view of a gas turbine engine 100, according to an exemplary embodiment. In general, exemplary embodiments discussed herein may be applicable to any type of engines, including turboshaft engines. The gas turbine engine 100 can form part of, for example, an auxiliary power unit for an aircraft or a propulsion system for an aircraft. The gas turbine engine 100 has an overall construction and operation that is generally understood by persons skilled in the art.

As shown, the engine 100 may be an annular structure about a longitudinal or axial centerline axis 162. In the description that follows, the term "axial" refers broadly to a direction parallel to the axis 162 about which the rotating components of the engine 100 rotate. This axis 162 runs from the front of the engine 100 to the back of the engine 100. The term "radial" refers broadly to a direction that is perpendicular to the axis 162 and that points towards or away from the axis of the engine 100. As used below, the terms "inner" and "outer" are relative terms in which "inner" is radially closer to the axis 162 than "outer". A "circumferential" direction at a given point is a direction that is normal to the local radial direction and normal to the axial direction. An "upstream" direction refers to the direction from which the local flow is coming, while a "downstream" direction refers to the direction in which the local flow is traveling. In the most general sense, flow through the engine tends to be from front to back, so the "upstream direction" will generally refer to a forward direction, while a "downstream direction" will refer to a rearward direction.

The gas turbine engine 100 may be disposed in an engine case 110 and may include a fan section 120, a compressor section 130, a combustion section 140, a turbine section 150, and an exhaust section 160. The fan section 120 may include a fan, which draws in and accelerates air. A fraction of the accelerated air exhausted from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan. The compressors may direct the compressed air into the combustion section 140. The compressors of the compressor section 130 may also provide a portion of the compressed air as cooling air to other portions of the engine 100, as discussed below. In the combustion section 140, the high pressure air is mixed with fuel and combusted. The combusted air is then directed into the turbine section 150.

As described in further detail below, the turbine section 150 may include a series of rotor and stator assemblies disposed in axial flow series. The combusted air from the combustion section 140 expands through the rotor and stator assemblies and drives the rotor assemblies to rotate a main engine shaft for energy extraction. As also discussed above, the turbine section 150 may have structures to improve the effectiveness of the cooling air from the compressor section 130. The air is then exhausted through a propulsion nozzle disposed in the exhaust section 160 to provide additional forward thrust.

Figure 2:
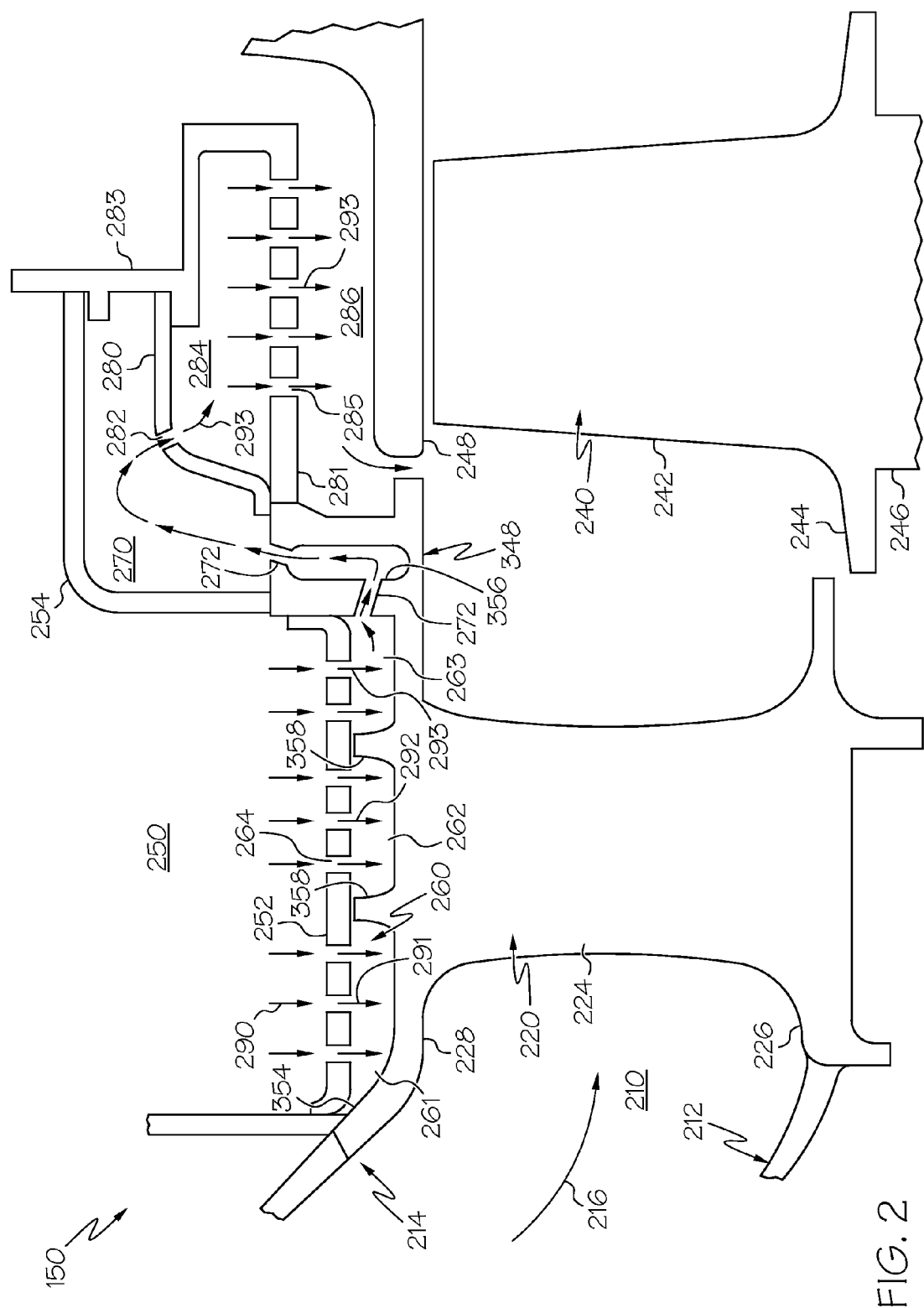
FIG. 2 is a partial cross-sectional elevation view of a turbine section of the gas turbine engine of FIG. 1 in accordance with an exemplary embodiment.

FIG. 2 is a partial cross-sectional elevation view of a turbine section 150 of the gas turbine engine 100 of FIG. 1 in accordance with an exemplary embodiment. The illustrated turbine section 150 may be part of a high pressure turbine or a low pressure turbine. The turbine section 150 may have an overall construction and operation that is generally known and understood by persons skilled in the art.

In general terms, the turbine section 150 includes a mainstream flow path 210 defined in part by an annular inner flow path boundary 212 and an annular outer flow path boundary 214 that receives mainstream hot gas flow 216 from the combustion section 140 (FIG. 1). In practice, the annular inner flow path boundary 212 and annular outer flow path boundary 214 are concentrically arranged to optimize aerodynamic and operational efficiency.

The turbine section 150 includes an alternating sequence of stator assemblies 220 and rotor assemblies 240 arranged within a housing. In general terms, the housing broadly refers to the components that house and support the stator and rotor assemblies 220, 240. In the view of FIG. 2, one stator assembly 220 and one rotor assembly 240 are shown. Although only one stator assembly 220 and one rotor assembly 240 are shown, such stator assemblies 220 and rotor assemblies 240 are typically arranged in alternating axially spaced, circumferential rows. In general, any number of stator and rotor assemblies 220, 240 may be provided. As discussed in greater detail below, the mainstream hot gas flow 216 flows within the boundaries 212, 214 past the stator and rotor assemblies 220, 240.

The stator assembly 220 is formed by a circumferential row of stator vanes (or airfoils) 224 (one of which is shown) extending radially between from an inner diameter end wall (or platform) 226 and an outer diameter end wall (or platform) 228. The end walls 226, 228 are mounted within the turbine section 150 to form a portion of the mainstream flow path 210. As described in greater detail below, the inner diameter end wall 226 and outer diameter end wall 228 may be continuous rings or arcuate segments arranged to form the inner flow path boundary 212 and annular outer flow path boundary 214, respectively, of the flow path 210.

The rotor assembly 240 is formed by a circumferential row of rotor blades 242 (one of which is shown) projecting radially outwardly from a circumferential rotor platform 244 mounted on the periphery of a rotor disk 246, which in turn circumscribes a main engine shaft (not shown). The housing includes a shroud 248 surrounding the rotor assembly 240 to form a portion of the outer flow path boundary 214. The shroud 248 axially extends at least between the leading and trailing edges of the rotor blade 242, typically in close radial proximity to the rotor blade 242. During operation, the mainstream hot gas flow 216 drives the rotor blades 242 and the associated rotor assembly 240 for power extraction, while the stator assemblies 220 are generally stationary To allow the turbine section 150 to operate at desirable elevated temperatures, certain components are cooled with air typically bled from the compressor section 130 (FIG. 1). In particular, details about cooling the outer diameter end wall 228 of the stator assembly 220 and the rotor shroud 248 will be provided below after a brief discussion of FIGS. 3-5, which provide additional details about the stator assembly 220.

Figure 3:
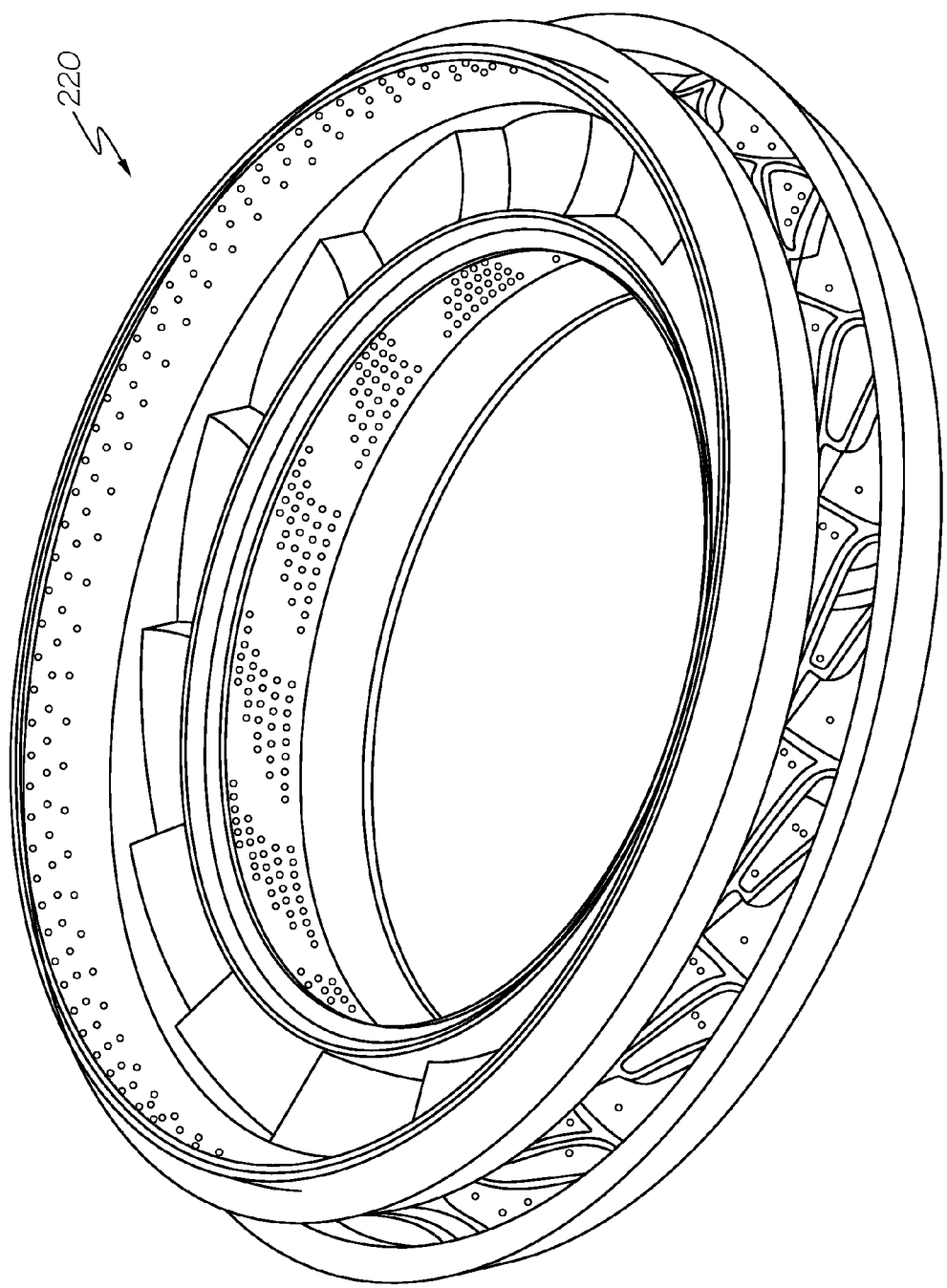
FIG. 3 is an isometric view of a full ring turbine stator assembly that may be incorporated into the turbine section of FIG. 2 in accordance with an exemplary embodiment.
Figure 4:
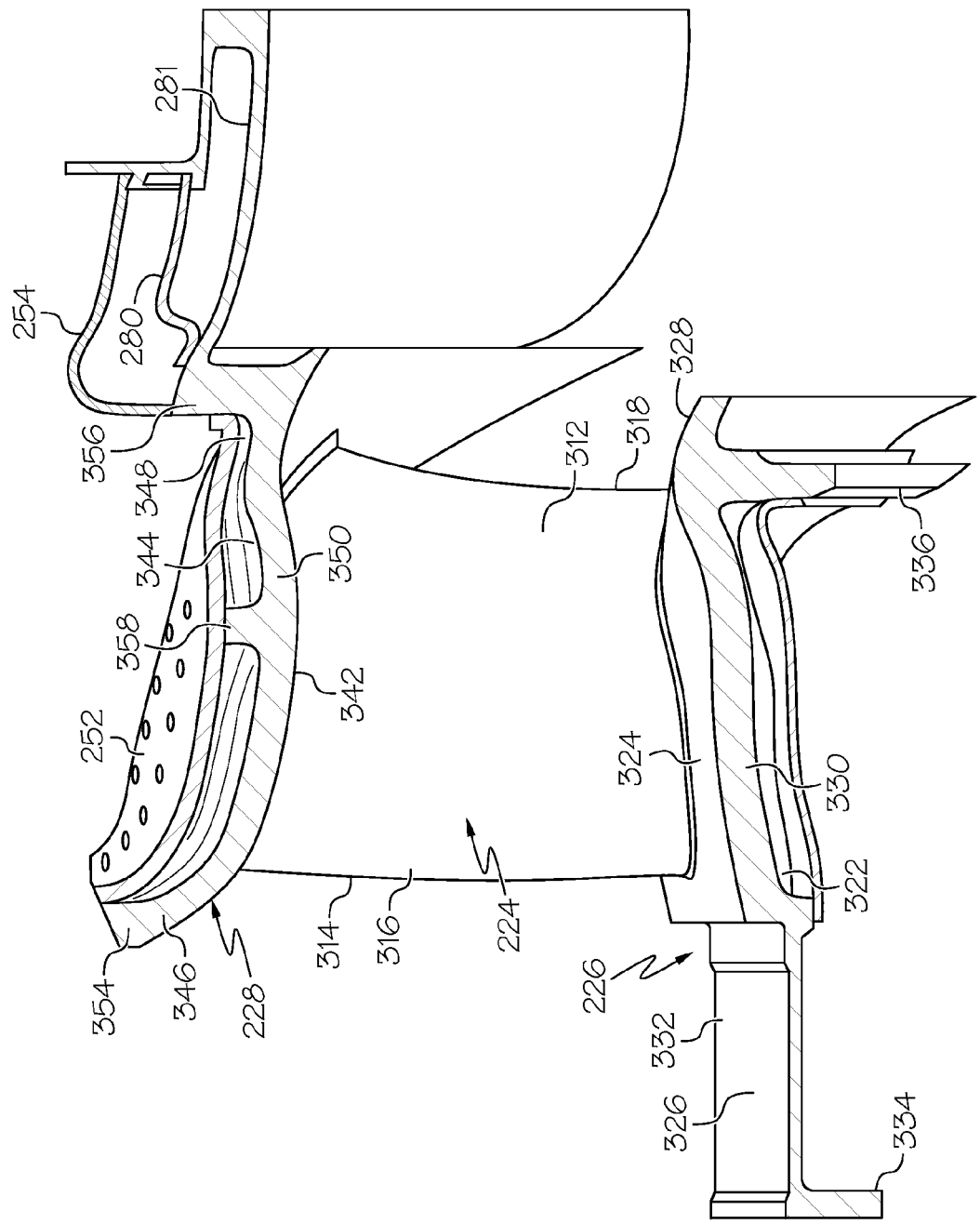
FIG. 4 is a section of the turbine stator assembly of FIG. 3 in accordance with an exemplary embodiment.
Figure 5:
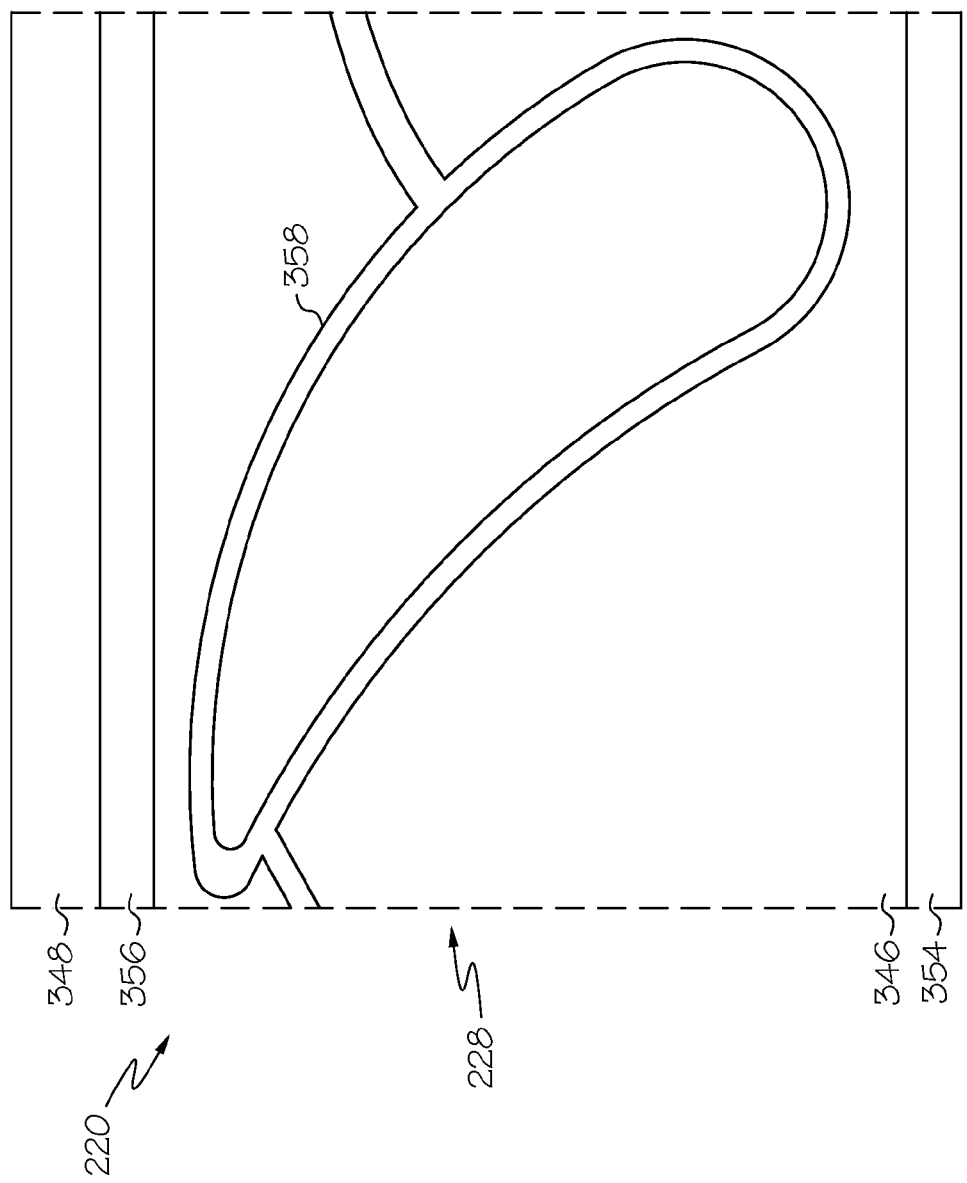
FIG. 5 is a top view of the turbine stator assembly of FIG. 3 in accordance with an exemplary embodiment.

FIG. 3 is an isometric view of an isometric view of a full ring turbine stator assembly, such as the stator assembly 220 of FIG. 2, removed from a turbine section. FIG. 4 is a partial, sectional view of the stator assembly 220 of FIG. 3, and FIG. 5 is a top partial view of the stator assembly 220 of FIG. 4 in accordance with an exemplary embodiment. Although FIGS. 3-5 depict one exemplary embodiment, other exemplary embodiments may have alternate configurations or arrangements. FIGS. 4 and 5 depict a partial view circumferential slice or portion of a continuous full ring stator assembly 220. Alternatively, a number of separate partial segments may be circumferentially arranged to form the annular structure of the stator assembly 220.

Referring to FIGS. 4 and 5, as introduced above, the stator assembly 220 includes stator vanes 224 (one shown in FIG. 4) extending radially between inner diameter end wall 226 and the outer diameter end wall 228. Generally, the stator vane 224 is formed by two side (or outer) walls 312, 314 each having outer surfaces that together define an airfoil shape. In a chordwise direction, the side walls 312, 314 are joined at a leading edge 316 and trailing edge 318. As used herein, the term "chordwise" refers to a generally longitudinal dimension along the airfoil from leading edge to trailing edge, typically curved for air flow characteristics.

The inner diameter end wall 226 may have an inner surface 322, an outer surface 324, a forward end 326, an aft end 328, and side edges 330, 332. As noted above, the outer surface 324 of the inner diameter end wall 226 partially defines a portion of the inner flow path boundary 212. The inner diameter end wall 226 further includes forward and aft rails 334, 336 extending in a radial direction from the inner surface 322 that facilitate mounting the stator assembly 220 in the turbine section 150.

The outer diameter end wall 228 may have an inner surface 342, an outer surface 344, a forward end 346, an aft end 348, and side edges 350 (one of which is shown). As noted above, the inner surface 344 of the outer diameter end wall 228 partially defines a portion of the outer flow path boundary 214. The outer diameter end wall 228 further includes forward and aft rails 354, 356 extending radially outward from the outer surface 342 that facilitate mounting the stator assembly 220 in the turbine section 150. As introduced above, FIG. 5 is a top view of the stator assembly 220 that illustrates the outer diameter end wall 228, including forward and aft rails 354, 356 and forward and aft ends 346, 348. In addition to the mounting function, the forward and aft rails 354, 356 may facilitate the flow of cooling air to desired locations. Other rails may also be provided, including as one example, an airfoil rail 358 that extends from the outer surface 344 and generally outlines the stator vane 224. Although not shown in FIG. 4, FIG. 3 additionally depicts baffles 254, 280, 281 discussed in greater detail below.

As described in greater detail below, cooling air may be delivered by various cooling circuits to portions of the turbine section 150. As examples, cooling air may be directed through internal cavities (not shown) in the rotor disk 246 and platform 244 to cool the rotor blades 242. Similarly, cooling air may be directed through the outer diameter end wall 228 and into the stator vanes 224. In accordance with exemplary embodiments, the turbine section 150 further includes a cooling circuit to direct cooling air to a portion the outer diameter end wall 228 and then to the rotor shroud 248. Additional details about this cooling circuit within the turbine section 150 will be discussed below with reference to FIGS. 2-5.

As introduced above, the turbine section 150 may have one or more cavities or structures to direct cooling air to desired locations. Such cooling air may be obtained as bleed air from the compressor section 130. Referring again to FIG. 2, the turbine section 150 includes a first (or main) cavity 250 that receives cooling air 290. The first cavity 250 is at least partially defined by a first baffle 252 extending over the stator assembly 220 and a second baffle 254 at least partially extending over the rotor shroud 248. The first baffle 252 extends in an axial direction from the forward end 346 to the aft rail 356 to cover the stator assembly 220, while the second baffle 254 is coupled to the aft rail 356 and extends over at least a portion of the rotor shroud 248.

A second cavity 260 is at least partially defined by the first baffle 252, the upper surface of the outer diameter end wall 228, the forward rail 354, and the aft rail 356. The second cavity 260 is fluidly coupled to the first cavity 250 by a first set of holes 264 formed within the first baffle 252. The holes 264 extend in a radial direction through the first baffle 252. The second cavity 260 may be considered to have one or more sub-cavities 261, 262, 263 at least partially defined, in some embodiments, by rails extending from the outer diameter end wall 228. As examples, the second cavity 260 may be considered to have a forward end sub-cavity 261 extending along the forward end 346, an airfoil sub-cavity 262 extending within the airfoil rail 358, and an aft sub-cavity 263 extending along the aft end 348.

A third baffle 280 and a fourth baffle 281 are positioned to at least partially circumscribe the outer surface of the shroud 248. The fourth baffle 281 extends from the aft rail 356 and may include one or more flanges 283 to create mounting or attachment points for the second and third baffles 254, 280. As shown, the second baffle 254 extends from the aft rail 356 to the flange 283 of the fourth baffle 281, and the third baffle 280 extends from the aft rail 356 to the flange 283. Any arrangement of baffles 254, 280, 281 may be provided, and one or more of the baffles 254, 280, 281 may be integral with one another and/or with the stator assembly 220. The baffles 254, 280, 281 function to create one or more cavities 270, 284, 286, as described below.

The third cavity 270 is at least partially defined by the aft rail 356, the third baffle 280, and the fourth baffle 281. The third cavity 270 may be fluidly coupled to the second cavity 260 by a second set of holes 272 formed in the aft rail 356 of the outer diameter end wall 228. Each hole 272 may extend in any suitable direction through the aft rail 356, including at least partially axial and at least partially radial, as depicted in FIG. 2. Generally, the holes 272 may be arranged as a row of holes 272 that extends in a circumferential direction. In some embodiments, two or more rows may extend in a circumferential direction. As also shown, the aft rail 356 may include a inter-cavity or void to receive the air flow through the holes 272 to impinge upon the aft rail. Generally, a seal is formed between the first baffle 252 and the aft rail 356 and between the second baffle 254 and the aft rail 356 such that the first cavity 250 is only fluidly coupled to the third cavity 270 through the second cavity 262, e.g., such that air does not leak directly between the first cavity 250 and the third cavity 270.

The fourth cavity 284 is formed by the third baffle 280 and the fourth baffle 281. The fourth cavity 284 is fluidly to the third cavity 270 by the third set of holes 282 formed in the third baffle 280. The holes 282 extend in a generally radial direction through the third baffle 280. The third baffle 280 may form a seal with the aft rail 356 and the fourth baffle 281 such that the third cavity 270 is only fluidly coupled to the fourth cavity 284 through holes 282. The third baffle 280 may function to meter the cooling air between the fourth cavity 284 and the fifth cavity 286. In some embodiments, the third baffle 280 may be omitted.

The fifth cavity 286 is formed by the fourth baffle 281 and the shroud 248. The fifth cavity 286 is fluidly coupled to the fourth cavity 284 by a fourth set of holes 285 formed in the fourth baffle 281. The holes 285 extend in a radial direction through the fourth baffle 281. The fourth baffle 281 may form a seal with the aft rail 356 and/or the third baffle 280 such that the fourth cavity 284 is only fluidly coupled to the fifth cavity 286 through holes 285. Generally, any number, size, or arrangement of holes 285 (as well as holes 264, 272, 282) may be provided to obtain the desired flow characteristics. Computational fluid dynamics (CFD) analysis may be used to determine the number, orientation, dimension, and position of the holes 264, 272, 282, 285. Such holes 264, 272, 282, 285 may be formed, for example, using EDM machining.

As such, the cooling circuit formed the various cavities 250, 260, 270, 284, 286 and baffles 252, 254, 280, 281 will now be described. As introduced above, cooling air 290 flows through the first cavity 250 in a radially inward direction. The cooling air 290 flows through the holes 264 in the first baffle 252 into the second cavity 260 to cool the stator assembly 220. In particular, a portion 291 flows through sub-cavity 261 to cool the forward end 346 of the outer diameter end wall 228, another portion 292 flows through the sub-cavity 262 to cool the stator vane 224, and a further portion 293 flows through the sub-cavity 263 to cool the aft end 348 of the outer diameter end wall 228. Although FIG. 2 depicts the different air flow portions 291-293 as cooling different areas of the outer diameter end wall 228, in some embodiments, one or more portions 291-293 may be combined or omitted. In one embodiment, the sub-cavities 261-263 are fluidly isolated from one another.

In any event, the cooling holes 264 are arranged such that the cooling air portion 293 impinges on the aft end 348. As used herein the term "impinge" or "impingement cooling" refers to a cooling flow striking the surface to be cooled at approximately 90° to enhance cooling effectiveness, particularly as compared to other types of cooling flows, such as film cooling. The portion of cooling air 293 that cools the aft end 348 of the outer diameter end wall 228 flows through the holes 272 formed in the aft rail 336 of the outer diameter end wall 228 into the third cavity 270. In the depicted embodiment, the cooling air 293 flows downstream through the holes 272 and then radially outward and downstream through the third cavity 270. The cooling air portion 293 subsequently flows radially inward through the holes 282 in the third baffle 280 into the fourth cavity 284. From the fourth cavity 284, the cooling air 293 flows radially inward through holes 285 into the fifth cavity 286. In the fifth cavity 286, the cooling air 293 cools the shroud 248. Typically, the cooling holes 285 are arranged such that the cooling air portion 293 impinges on the outer surface of the shroud 248. The cooling air cools the shroud 248 and flows out of the first cavity 286 through a space between the shroud 248 and the stator assembly 220. As such, the cooling air 293 that cools the aft end of the outer diameter end wall 228 is then used to cool the shroud 248. This enables a more efficient use of the collective base of cooling air 290 in cavity 250 rather than separating the cooling air into multiple flows upstream of the stator assembly 220. The same air flow portion 293 is used twice for sequential impingement cooling. In effect, the shroud cooling air flow 293 is "pre-used" to increase the effectiveness of the overall cooling flow. Since the shroud 248 typically operates at lower temperatures than the stator assembly 220, the increased temperature of the cooling air 293 from the stator assembly 220 is an acceptable trade-off, particularly considering the resulting ability to increase cooling of the stator assembly 220 and/or to reduce the overall volume of cooling air.

In general, design of the baffles, holes, and cavities may depend on various factors, including application and engine design. In one exemplary embodiment, the cooling circuit is provided to maintain the stator assembly 220 and rotor shroud 248 at suitable temperatures. Considerations may include engine application, required heat extraction, stress analysis, the temperature and pressure of the cooling air, and cooling effectiveness. Although not described in detail, the impingement cooling described above may be combined with other cooling techniques, including turbulence promoters and film cooling.

Exemplary embodiments may minimize the amount of air necessary to cool the gas turbine engine and increase efficiency. Additionally, because of the relative simplicity of the design, the systems and methods disclosed herein can be readily incorporated on new design engines or it can be economically retrofitted on existing engines. The gas turbine engine assemblies produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine section of a gas turbine engine, comprising:
   a stator assembly comprising an inner diameter end wall, an outer diameter end wall, and a stator vane extending between the inner diameter end wall and the outer diameter end wall within a mainstream gas flow path;
   a turbine rotor assembly downstream of the stator assembly and including a rotor blade extending into the mainstream gas flow path;
   a housing including an annular shroud that circumscribes the rotor blade and at least partially defines the mainstream hot gas flow path;
   a first baffle arranged to define a first cavity with the outer diameter end wall of the stator assembly;
   a second baffle; and
   a third baffle arranged to define a second cavity with the second baffle and a third cavity with the shroud, wherein the first cavity is fluidly coupled to the second cavity and the second cavity is fluidly coupled to the third cavity such that cooling air flows from the first cavity to the second cavity and from the second cavity to the third cavity, wherein the first baffle includes a first set of holes configured to direct a first portion of cooling air to impinge on the outer diameter end wall, wherein the stator assembly includes an aft rail extending radially from the outer diameter end wall to the first baffle, and wherein the aft rail defines a second set of cooling holes to fluidly couple the first cavity to the second cavity, wherein the first baffle is configured to direct the first portion of cooling air to impinge on an aft end of the outer diameter end wall, wherein the first cavity is formed by a first sub-cavity proximate to a leading edge of the outer diameter end wall, a second sub-cavity proximate to the stator vane, and a third sub-cavity proximate to the aft end of the outer diameter end wall, wherein the first, second, and third sub-cavities are fluidly isolated from one another.

2. The turbine section of claim 1, wherein the rotor blade has a leading edge and a trailing edge, and wherein the third baffle extends in an axial direction between the leading edge and the trailing edge of the rotor blade.

3. The turbine section of claim 1, wherein the third baffle includes a third set of holes configured to direct the first portion of cooling air into the third cavity to impinge on the shroud.

4. The turbine section of claim 3, wherein the third set of holes is configured to direct the first portion of cooling air into the third cavity and onto a radially outer surface of the shroud.

5. The turbine section of claim 4, further comprising a fourth baffle within the second cavity.

6. The turbine section of claim 4, further comprising a main cavity supplying the cooling air to the first cavity, and wherein the second baffle forms a seal to block the cooling air from flowing directly from the main cavity into the second cavity.

7. A method for cooling turbine components in a gas turbine engine, comprising the steps of:

directing a flow of cooling air from a main cavity through a first set of holes in a first baffle into a first cavity to impinge on an outer diameter end wall of a stator assembly;

directing a first portion of the flow of cooling air through a second set of holes in an aft rail of the outer diameter end wall of the stator assembly radially outward into a second cavity; and directing the first portion of the flow of cooling air through a third set of holes in a second baffle into a third cavity to impinge onto a radially outer surface of a rotor shroud, wherein the second cavity is formed by a third baffle and the second baffle, and wherein the method further comprises sealing the third baffle and the first baffle to block the flow of cooling air from flowing directly from the main cavity into the second cavity, and wherein the first cavity is formed by a first sub-cavity proximate to a leading edge of the outer diameter end wall, a second sub-cavity proximate to the stator vane, and a third sub-cavity proximate to the aft end of the outer diameter end wall, and wherein the step of directing the flow of cooling air from the main cavity through the first set of holes includes fluidly isolating the first, second, and third sub-cavities from one another.

8. The method of claim 7, wherein the step of directing the flow of cooling air from the main cavity through the first set of holes in the first baffle into the first cavity includes directing the flow of cooling air at an angle of 90° to impinge on the outer diameter end wall of the stator assembly.

9. The method of claim 8, wherein the step of directing the first portion of the flow of cooling air through the third set of holes in the second baffle into the third cavity includes directing the first portion of the flow of cooling air at an angle of 90° to impinge on the rotor shroud.

* * * * *